Figure 1:
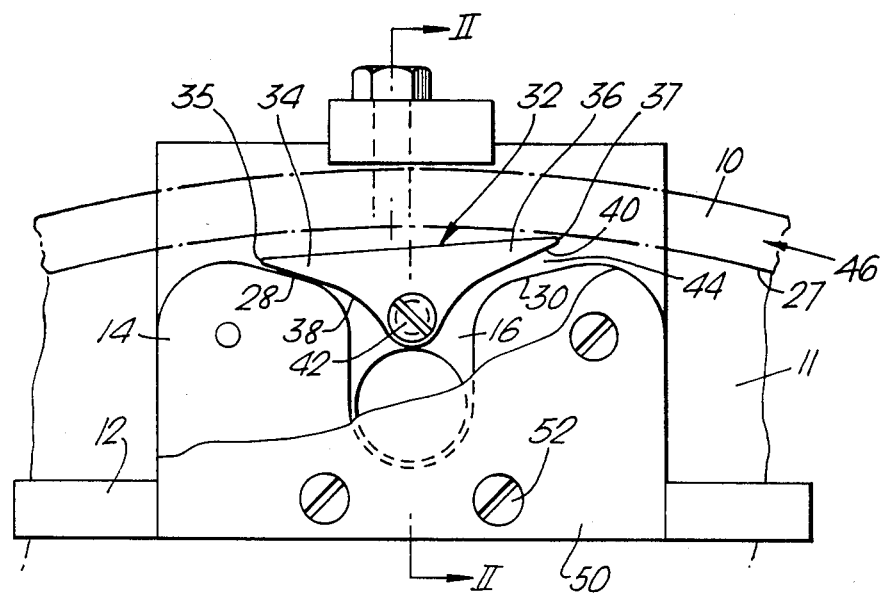

United States Patent [19]

White

[11] Patent Number: 4,541,737
[45] Date of Patent: Sep. 17, 1985

[54] SCOOP FOR PICKING UP LUBRICANT

[75] Inventor: William W. White, Glasgow, Scotland

[73] Assignee: James Howden & Company Limited, Glasgow, Scotland

[21] Appl. No.: 667,103

[22] Filed: Nov. 1, 1984

[30] Foreign Application Priority Data

Nov. 7, 1983 [GB] United Kingdom ............. 8329687

[51] Int. Cl.[4] .................... F16C 33/10; F16N 7/14
[52] U.S. Cl. ........................ 384/406; 184/11.4
[58] Field of Search ............ 384/137, 296, 403, 404, 384/406; 137/625.4, 625.41, 112; 251/304; 184/11.1, 11.2, 11.3, 11.4

[56] References Cited

U.S. PATENT DOCUMENTS 4,448,552  5/1984  White et al. ............... 384/404

Primary Examiner—Stuart S. Levy
Assistant Examiner—Lynn M. Sohacki
Attorney, Agent, or Firm—Barnes & Thornburg

[57] ABSTRACT

A scoop for picking up lubricant from the inner cylindrical surface of a peripheral ring of a disc or a shaft dipping into a sump of lubricant in which a deflector (32) is rockable between two positions. In the position illustrated in FIG. 1, the tip (37) of one arm of the deflector is adjacent the cylindrical surface (27) while the inner surface (38) of the other arm seals against the surface (28) on the body (14), a passage (44) being provided for the flow of lubricant. In the other position, for the opposite direction of rotation, the tip (35) is adjacent the surface (27) and the surfaces (30) and (40) provide a seal.

4 Claims, 2 Drawing Figures

U.S. Patent  Sep. 17, 1985  4,541,737

SCOOP FOR PICKING UP LUBRICANT

DESCRIPTION

The present invention relates to a scoop for picking up lubricant from the inner cylindrical surface of a peripheral ring on a disc mounted on a shaft and dipping into a sump of lubricant.

There has been proposed in European Pat. No. 0073281 a bearing, particularly a heavy duty bearing, in which lubrication is effected by a lubricant being picked up on a disc mounted on the bearing shaft, the disc having, at its periphery, an axially extending ring on the inner and outer surface of which the lubricant forms a film. During start-up, lubricant on the outer surface is scraped off by an external scraper and falls under gravity onto the bearing surface and, as the speed increases, lubricant on the inner surfaces is picked up by the scoop to produce a pressure head sufficient to pump lubricant to a reservoir from which it flows to the bearing surface under gravity. The lubricant is pumped to the reservoir through an external cooler and an external filter.

Such a construction is very satisfactory and substantially reduces the cost as compared with known bearings and yet allows one to provide a cooler and a filter without the necessity for a separate pump. In the particular construction illustrated in the said Patent Application, the scoop comprises a scroll having its axis parallel to the shaft axis and a cooperating wall spaced inwardly of the scroll and forming therewith a mouth directed to pick up lubricant as the shaft rotates and lead it to said conduit. In a particular construction there is a second similar scroll having its axis parallel to the first axis and a second cooperating wall spaced inwardly of said scroll and forming therewith a second mouth directed in the opposite direction to the mouth of the first scroll, to pick up lubricant as the shaft rotates in the opposite direction and to lead the lubricant to said conduit, a valve, usually a ball, being provided between each mouth and the conduit, to prevent lubricant from flowing in the reverse direction towards either of the mouths. This arrangement allows the bearing to operate equally well in either rotational direction. However, the construction of the scoop is rather complex and adds to the expense of the bearing.

It is now proposed, according to the present invention, to provide a scoop for such a bearing, said scoop comprising a body formed with a chamber therein, an outlet for lubricant from said chamber, first and second convergent surfaces formed on said body and defining a mouth leading to said chamber, a pivotal deflector mounted within said mouth and having first and second oppositely directed arms, the first and second arms having first and second faces respectively directed towards said first and second convergent surfaces respectively, the deflector being pivotal from one position, in which the tip of the first arm abuts and seals against the first convergent surface and the tip of the second arm is positioned adjacent the inner surface of the peripheral ring, the second face and second convergent surface then defining a passage into the chamber, to another position in which the tip of the second arm abuts and seals against the second convergent surface and the tip of the first arm is positioned adjacent the inner surface of the peripheral ring, the first face and first convergent surface then defining a passage into the chamber.

Such a construction is very simple and the deflector just flops from one position to the other when the rotation of the disc is reversed. The actual parts of the scoop are very easy to manufacture, thereby reducing the cost of the bearing significantly.

In a preferred construction, the first and second convergent surfaces and the first and second faces are shaped so that the passages formed thereby are divergent in the direction towards the chamber. This enables the velocity component of the lubricant which is picked up readily to be converted to a pressure head which is adequate to cause the lubricant to flow through the closed conduit, and where provided, through the cooler and filter.

In order that the invention may more readily be understood, the following description is given, merely by way of example, reference being made to the accompanying drawings, in which:

FIG. 1 is a side elevation of a portion of a bearing similar to that of European Pat. No. 073281, and including one embodiment of scoop according to the present invention; and FIG. 2 is a section taken along the line 2—2 of FIG. 1.

Figure 2:
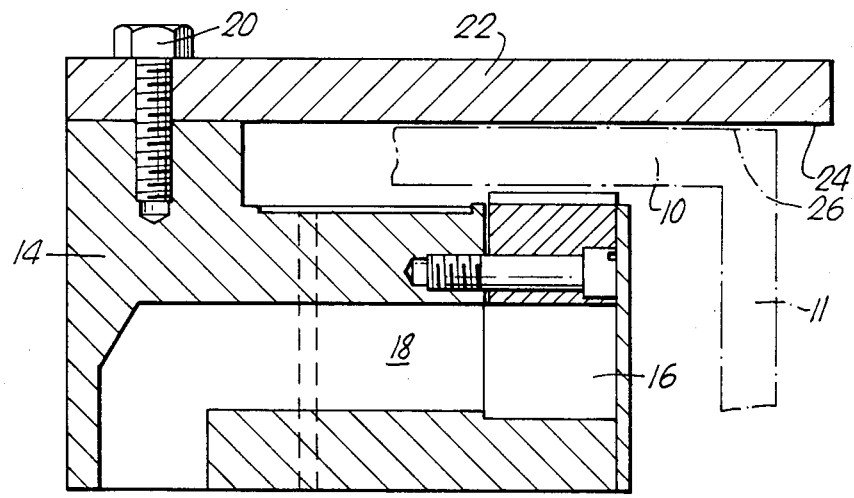

In FIGS. 1 and 2 there is illustrated the peripheral ring 10 of a lubricating disc 11 mounted on a shaft (not shown), which passes through a bearing. A bracket 12 is formed with a body 14 having a chamber 16 formed centrally therein, the chamber having an outlet conduit 18 leading to a reservoir.

Mounted on the body 14 by means of a bolt 20 is an external scraper 22 which has its inner surface 24 located adjacent the external surface 26 of the ring 10.

As seen in FIG. 1, the body 14 is formed with a first convergent surface 28 and a second convergent surface 30 which form a mouth leading to the chamber 16. Pivotally mounted within this mouth is a deflector 32 having a first arm 34 and a second arm 36 extending in opposite directions, the arms having tips 35 and 37 respectively. The lower surfaces of the arms 34 and 36 are provided with first and second faces 38, 40 which are directed towards the surfaces 28 and 30 respectively. The deflector 32 is pivotally or rockably mounted about a pivot 42 so that it can move between two extreme positions. In the position illustrated, the first arm 34 has its face 38 in sealing abutting relation with the first convergent surface 28 and there is formed between the face 40 and the surface 30 a passage 44. In this position the tip 37 of the arm 36 is closely adjacent the inner surface 27 of the ring 10 and is so positioned as to scrape lubricant therefrom as the ring 10 moves in an anticlockwise direction, as illustrated by the arrow 46 in FIG. 1. The passage 44 is initially convergent to assist in picking up the lubricant and is subsequently divergent as the passage opens into the chamber 16. Thus, the kinetic energy of the fluid as it flows through the passage 40 is converted to provide a pressure head in the chamber 16, thereby to increase the pressure to force lubricant out through the outlet conduit 18.

If the disc 11 and the ring 10 are caused to rotate in a clockwise direction, the deflector 32 will rock to a different pivotal position in which the face 40 is in sealing abutting relation with the surface 30 and a similar passage to the passage 44 is then formed between the surfaces 38 and 28.

It will be appreciated that the construction illustrated is very simple and easy to manufacture.

In order to maintain the pressure within the system, a cover plate 50 is mounted on the body 14 and is retained in place by bolts 52.

I claim:

1. A scoop for picking up lubricant from the inner cylindrical surface of a peripheral ring on a disc mounted on a shaft and dipping into a sump of lubricant, said scoop comprising, in combination:
   (a) a body formed with a chamber therein;
   (b) an outlet for lubricant from said chamber;
   (c) first and second convergent surfaces formed on said body and defining a mouth leading to said chamber;
   (d) a pivotal deflector mounted within said mouth;
   (e) a pivot pivotally mounting said deflector on said body;
   (f) first and second oppositely directed arms on said deflector and each having a top thereon remote from said pivot;
   (g) first and second faces on said first and second arms respectively directed towards said first and second convergent surfaces respectively; and
   (h) said deflector being pivotal from one position, in which the tip of the first arm abuts and seals against the first convergent surface and the tip of the second arm is positioned adjacent the inner surface of the peripheral ring, the second face and second convergent surface then defining a passage into the chamber, to another position in which the tip of the second arm abuts and seals against the second convergent surface and the tip of the first arm is positioned adjacent the inner surface of the peripheral ring, the first face and first convergent surface then defining a passage into the chamber.

2. A scoop as claimed in claim 1, wherein said first and second convergent surfaces and said first and second faces are shaped whereby said passages formed thereby are divergent in the direction towards said chamber.

3. A scoop as claimed in claim 1, wherein the first and second convergent surfaces and the first and second faces of the deflector are symmetrical so that the passage formed in said one position is precisely symmetrically complementary to the passage formed in said another position.

4. In a bearing comprising a fixed part having a bearing surface, a shaft rotatable in the bearing surface, a radially extending disc mounted on the shaft for rotation therewith, an axially extending ring mounted on said disc at a location spaced radially from the shaft, a lubricant reservoir, means to feed lubricant from the reservoir to said bearing surface, means to lead lubricant from said bearing surface to the vicinity of the lower part of the ring, a lubricant scoop mounted within said ring and closely adjacent thereto, a closed conduit leading from said scoop to said reservoir, the arrangement being such that, upon rotation of said shaft, a film of lubricant is formed in the inner surface of said ring, this film being picked up by said scoop to produce a pressure head sufficient to pump lubricant via a filter and a cooler to said reservoir, the improvement consisting in that said scoop comprises, in combination:
   (a) a body formed with a chamber therein;
   (b) an outlet for lubricant from said chamber;
   (v) first and second convergent surfaces formed on said body and defining a mouth leading to said chamber;
   (d) a pivotal deflector mounted within said mouth;
   (e) a pivot pivotally mounting said deflector on said body;
   (f) first and second oppositely directed arms on said deflector and each having a top thereon remote from said pivot;
   (g) first and second faces on said first and second arms respectively directed towards said first and second convergent surfaces respectively; and
   (h) said deflector being pivotal from one position, in which the tip of the first arm abuts and seals against the first convergent surface and the tip of the second arm is positioned adjacent the inner surface of the peripheral ring, the second face and second convergent surface then defining a passage into the chamber, to another position in which the tip of the second arm abuts and seals against the second convergent surface and the tip of the first arm is positioned adjacent the inner surface of the peripheral ring, the first face and first convergent surface then defining a passage into the chamber.

* * * * *